（12） United States Patent
Burgess

(10) Patent No.: US 7,106,171 B1
(45) Date of Patent: *Sep. 12, 2006

(54) KEYLESS COMMAND SYSTEM FOR VEHICLES AND OTHER APPLICATIONS

(76) Inventor: James P. Burgess, 1343 Wood Duck Trail, Naples, FL (US) 34108

( * ) Notice: Subject to any disclaimer, the term of this patent is extended or adjusted under 35 U.S.C. 154(b) by 0 days.

This patent is subject to a terminal disclaimer.

(21) Appl. No.: 09/567,582

(22) Filed: May 10, 2000

Related U.S. Application Data

(63) Continuation-in-part of application No. 09/468,629, filed on Dec. 21, 1999, which is a continuation of application No. 09/061,403, filed on Apr. 16, 1998, now Pat. No. 6,031,465.

(51) Int. Cl.
G05B 23/00 (2006.01)

(52) U.S. Cl. ............. 340/5.72; 340/426.1; 340/825.69; 340/825.72; 340/5.8; 340/5.81; 340/10.42; 340/5.61; 340/5.6

(58) Field of Classification Search ............... 340/5.72, 340/426, 825.69, 5.8, 5.81, 10.42, 5.61, 5.6, 340/426.1, 825.72, 5.85
See application file for complete search history.

(56) References Cited

U.S. PATENT DOCUMENTS

| 4,205,325 | A |   | 5/1980  | Haygood et al. ........... 340/147 |
| 4,232,289 | A |   | 11/1980 | Daniel ........................ 340/64 |
| 4,638,292 | A |   | 1/1987  | Mochida et al. ............. 340/63 |
| 4,673,914 | A |   | 6/1987  | Lee ............................. 340/64 |
| 4,700,375 | A | * | 10/1987 | Reed .......................... 455/573 |
| 4,754,255 | A | * | 6/1988  | Sanders et al. ............... 340/64 |
| 4,786,900 | A |   | 11/1988 | Karasawa et al. ..... 340/825.31 |
| 5,077,831 | A |   | 12/1991 | Weber ......................... 455/68 |
| 5,134,392 | A | * | 7/1992  | Takeuchi et al. ....... 340/825.69 |
| 5,252,960 | A |   | 10/1993 | Duhame ................. 340/825.56 |
| 5,387,858 | A | * | 2/1995  | Bender et al. ................ 320/61 |
| 5,467,080 | A |   | 11/1995 | Stoll et al. ............. 340/825.31 |
| 5,525,992 | A |   | 6/1996  | Froschermeier ............. 342/42 |
| 5,563,600 | A |   | 10/1996 | Miyake ...................... 341/173 |
| 5,760,701 | A |   | 6/1998  | Mitsumoto ............. 340/825.31 |

(Continued)

FOREIGN PATENT DOCUMENTS

CA 2156236 8/1995

(Continued)

Primary Examiner—Wendy R. Garber
Assistant Examiner—Vernal Brown
(74) Attorney, Agent, or Firm—Gifford, Krass, Groh, Sprinkle, Anderson & Citkowski, PC

(57) ABSTRACT

A wireless remote-control transmitter includes means for entering an identification code so that only an authorized operator can use the device. Use as a keyless entry system provides the owner of a wireless receiver with an additional keypad-operated transmitter which may be vehicle mounted to perform some or all of the same functions as those available through an existing remote. In this embodiment, the keypad may be mounted behind a small section of the vehicle's window glass, with command inputs being sensed using electrical, magnetic, or optical detection techniques. To save on battery power, the system automatically powers down during periods of non-use, with some form of wake-up signal being used to enter operational modes requiring increased power consumption. The transmitter may also be mounted in the trunk, preferably with an illuminated or glow-in-the-dark trunk unlock button and without the need for entry of an authorization code, thereby enabling a child, for example, to unlock the trunk from within without having to hardwire the car for this capability.

18 Claims, 4 Drawing Sheets

U.S. PATENT DOCUMENTS

| | | | |
|---|---|---|---|
| 5,835,868 A | 11/1998 | McElroy et al. | 701/2 |
| 5,859,479 A * | 1/1999 | David | 307/10.8 |
| 5,859,779 A | 1/1999 | Giordano et al. | 364/479.01 |
| 6,018,292 A | 1/2000 | Penny, Jr. | 340/426 |
| 6,320,514 B1 * | 11/2001 | Flick | 340/825.69 |
| 6,349,984 B1 * | 2/2002 | Marrazzo et al. | 292/336.3 |
| 6,484,080 B1 * | 11/2002 | Breed | 701/36 |

FOREIGN PATENT DOCUMENTS

| | | |
|---|---|---|
| DE | 195 11 386 C1 | 3/1995 |
| EP | 0 140 137 B1 | 9/1984 |
| EP | 0 292 796 A2 | 5/1988 |
| EP | 0 314 143 B1 | 10/1988 |
| EP | 0 886 024 A2 | 6/1998 |

* cited by examiner

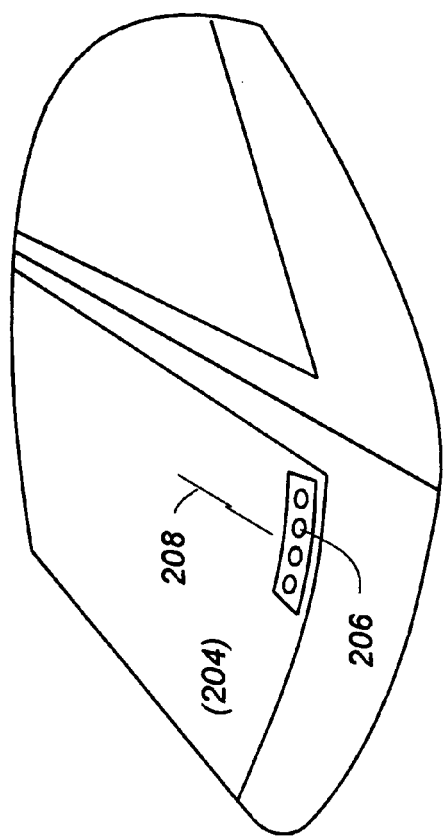
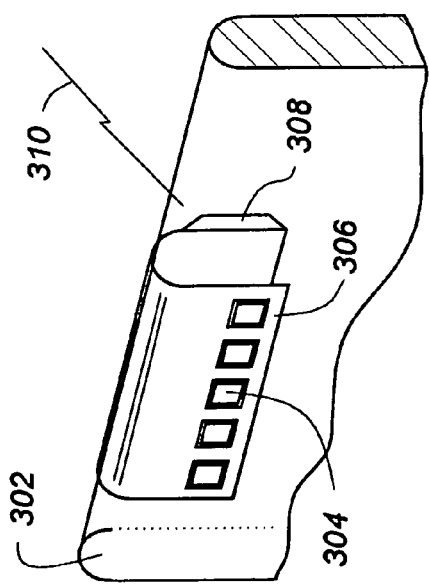
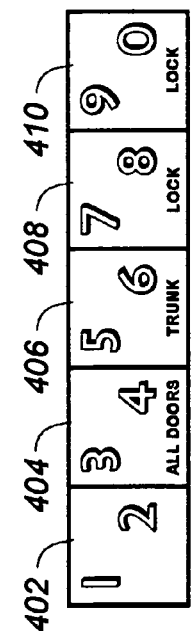

KEYLESS COMMAND SYSTEM FOR VEHICLES AND OTHER APPLICATIONS

REFERENCE TO RELATED APPLICATIONS

This application is a continuation-in-part of co-pending U.S. patent application Ser. No. 09/468,629, filed Dec. 21, 1999, which is a continuation of U.S. patent application Ser. No. 09/061,403, filed Apr. 16, 1998, now U.S. Pat. No. 6,031,465, the entire contents of all of which are incorporated herein by reference.

FIELD OF THE INVENTION

This invention relates generally to wireless command systems and, in particular, to a transmitter that uses remote transmitter codes to unlock doors or perform other functions in response to an operator input.

BACKGROUND OF THE INVENTION

Many higher-end cars and trucks now come equipped with keyless entry systems. These typically take the form of a pocket-sized fob with several pushbuttons that unlock doors and perform other functions through encoded RF signals transmitted to a vehicle-installed receiver. Depending upon the sophistication of the system, keys may be provided to activate and deactivate alarms, turn lights on or off, and even start the car on cold days. Though convenient, keyless entry systems of the type just described may cost several hundred dollars, even if factory installed. As the costs of electronic hardware has decreased, the use of these systems have proliferated even with less expensive vehicles.

Certain types of vehicles, luxury cars in particular, also come equipped with door-mounted keyless entry systems. These typically take the form of a keypad strip positioned close to the door handle, enabling an authorized user of the vehicle to punch in a numeric code and gain entry to the vehicle. These keypad strips are generally low in profile for easy maintenance. There are also vehicles equipped with both wireless and door-mounted keyless entry systems, but they are generally unrelated in terms of electronic protocol. That is, the wireless systems transmit RF codes, whereas the door-mounted systems are hard-wired and do not require sophisticated encoding.

The present invention addresses the desire to combine wireless and vehicle-mounted keyless-entry modalities in a cost-effective system configuration. Although there are many patents and other references related to the problem of keyless-entry, none address the problem solved by the instant invention. U.S. Pat. No. 5,467,080 to Stoll et al., for example, discloses a hardwired, keypad-actuated, keyless entry system where the keypad is integrated into the body of the car. This patent resides in the use of a capacitive, touch sensitive keypad, and does not discuss the use of a wireless transmitter.

U.S. Pat. No. 5,252,960 to Duhame discloses a keypad entry transmitter for use with a garage door opener. A wireless transmitter including a keypad is mounted outside of the garage such that when the proper code is entered into the keypad, the transmitter delivers a garage door opening signal to a receiver mounted inside of the garage. This patent fails to disclose a vehicle mounted keypad in general, or the use of keys operable through glass, in particular.

U.S. Pat. No. 5,077,831 to Weber discloses a wireless transmitter which requires the code to be input before the transmitter becomes active. This patent fails to disclose a vehicle mounted transmitter or any details of the code input portion.

SUMMARY OF THE INVENTION

The present invention enables the owner of a vehicle equipped with a receiver of remote-control codes to have an additional, keypad-operated transmitter to perform some or all of the same functions as those available through the use of an existing wireless transmitter. For use in conjunction with an existing wireless transmitter/receiver, the transmitter provided by the invention preferably uses some or all of the same codes as the existing remote transmitter to perform a desired function such as door or trunk unlocking, windows, light activation, and so forth. The inventive system may be provided as a factory-, dealer-, after-market or owner-installed option, and use of the additional transmitter does not preclude the use of existing remote(s). Although the system is ideal for use with vehicles such as cars and trucks, the concepts are applicable to various types of entry and other command systems on homes, office buildings, boats, off-road equipment, and other vehicles and enclosures.

A remote-control transmitter according to one embodiment of the invention includes means for entering an identification code so that only an authorized operator can use the device. The identification code may be entered through one or more of the same keys used to operate the transmitter, or means specific to operator authorization may be provided. The use of an identification code allows the authorized operator to be less concerned that the inventive remote-control transmitter will be discovered or tested by an unauthorized user. As such, the transmitter may be mounted directly on a vehicle, for example, in much the same manner as existing hard-wired keyless entry systems, but without the need for any vehicle modification.

In an alternative arrangement, a user carries a wallet-sized card or other device, such that upon activation of the keypad associated with the inventive transmitter, a signal is first sent to the user for verification. If the card or other device carried by the user properly transponds an appropriate authorization signal, the inventive transmitter broadcasts the codes appropriate to the function being requested. As with the other embodiments of the invention, the transmitted signals preferably correspond to the signals which would otherwise have been transmitted by an existing fob-type keyless transmitter, thereby utilizing an existing wireless signal receiver without modification. Through the use of card or other device acting as a verification transponder, this embodiment of the invention does not require that an authorization code be entered prior to the transmission of the command signal.

The inventive transmitter and keypad may be installed inside or outside of the vehicle, depending upon the desired configuration. Nor does the invention preclude the use of multiple transmitters, whether mounted externally or within the vehicle. For example, a transmitter may conveniently be mounted in the trunk, preferably with an illuminated or glow-in-the-dark trunk unlock button. Such a placement enables a child, for example, to unlock the trunk from within without having to hardwire the car for this capability. As yet a further alternative configuration, the inventive transmitter may be programmed to broadcast existing remote keyless entry codes in response to a signal broadcast by a cellular telephone or personal digital assistant, particularly if enabled with a close-range communication capability such as bluetooth technology.

To implement an external keypad, the keypad may be mounted proximate to the top edge of a side window, and communicate with the transmitter and other electronics within the vehicle through a flexible connector draped over the top edge of the window. In an entirely internal embodiment, the switch panel is mounted behind a small section of the vehicle's window glass, in a lower corner of the windshield, for example, with electrical, magnetic or optical proximity detection being used to sense the operator's finger or operator movements through the glass.

The inventive transmitter is preferably battery-operated, thereby obviating the need for extraneous wiring to the device. To conserve battery power, the system automatically powers down during periods of non-use, with the entry of an appropriate stimulus being used to initiate operational modes requiring increased power consumption. In one embodiment, entry of the authorization code may be used as a wake-up signal such that for a short period of time—a few seconds, for example—depression of the appropriate buttons will initiate a desired function. In another embodiment, a sensor is used to detect a sound or a vibration such as tapping on the glass of the vehicle which, in turn, functions as a wake-up signal. To further prevent false activation, the tapping or other input associated with the wake-up may, itself, be programmably encoded.

BRIEF DESCRIPTION OF THE DRAWINGS

FIG. 3 is an oblique drawing which shows an inside windshield-mounted keypad configuration;

FIG. 4 is an oblique drawing of an alternative implementation of a partly internal and partly external keypad and transmitter configuration;

FIG. 5 is a drawing of a keypad configuration according to the invention.

DETAILED DESCRIPTION OF THE INVENTION

Figure 1:
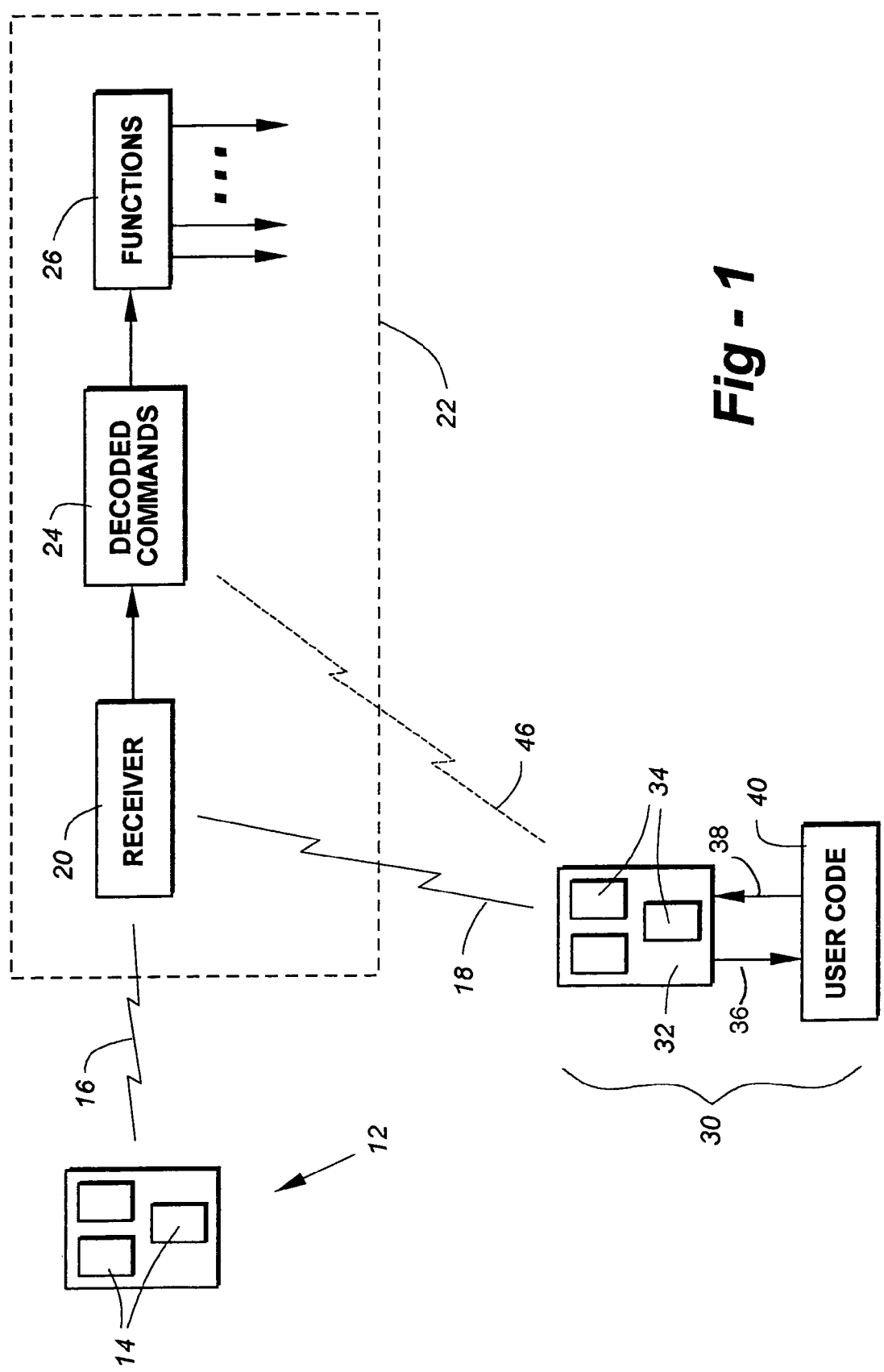
FIG. 1 is a block diagram used to provide an overview of the invention.

FIG. 1 is a block-diagram drawing used to introduce apparatus relevant to the invention, and to explain important functions made possible by the apparatus. The invention is configured for use in conjunction with a receiver 20 of wireless command signals 16 which may emanate from a portable control device 12 having one or more buttons 14. The receiver 20 is typically associated with the entry or operation of a system such as a vehicle 22, though it will be appreciated by one of skill in the art that the invention is equally applicable to other situations and environments such as home security, garage-door control and so forth.

Particularly in vehicular applications, the controller 12 may take the form of a hand-held "fob," having button such as LOCK, UNLOCK, PANIC, and so forth, though as explained in further detail elsewhere herein, the invention is not limited in terms of the number or types of commands output by the device 12, or recognizable by the receiver 20. These wireless commands, which may be encrypted or otherwise rendered impervious to tampering through the use of synchronization or other schemes, are decoded at block 24 so that they may be used to provide certain functions represented by block 26, such as unlocking doors, turning on lights, security systems arm/disarm, open fuel doors, restore memorized seat or mirror configurations, start the engine or heater, or any other existing or yet to be implemented function appropriate to keyless remote control.

A remote-control transmitter 30 includes an enclosure 32 having one or more buttons 34. The form and function of the transmitter 32 may be similar if not identical to that of the controller 12, in that the buttons 34 may be arranged similarly to those found on the controller 12, and may be used to broadcast the same wireless signal(s) to initiate the same functions at block 26. As an alternative, however, particularly since embodiments according to the invention may be mounted internal to the vehicle or other system being controlled, a non-encrypted or otherwise simplified wireless signal 46 may instead be used, thereby obviating sophisticated scrambling electronics or decoding procedures, by communicating directly with the decoded command block 24. The invention is not limited in terms of wireless technology or modulation scheme, and may utilize radio-frequency (RF), infrared (IR) or any other appropriate form of wireless communications. Since inventive system 30 preferably transmits one or more of the same signals to which existing receiver 20 is responsive, a loss in functionality of system 30 may be indicative that unit 12, receiver 20—or both—have been reprogrammed or tampered with by unauthorized personnel.

Importantly, the invention further includes the ability to recognize a user authorization code at block 40, such that the wireless command signals will not be sent unless the proper code is first received with respect to an appropriate user. The user code may be entered by the user into the device 32 as described below, or, alternatively, block 40 may represent a wallet-sized card or device carried by the user, in which case, when buttons 34 are initially used, a signal 36 is transmitted to the device 40, and if an authorization signal 38 is received by the unit 32, signals such as 18 (or 46), are transmitted without the user needing to be enter a separate code. As a further alternative, devices 32 or 40 may represent portable electronic devices providing other communication or computing functions, such as cellular telephones or personal digital assistant equipped with a wireless command language such as bluetooth technology. If such a device replaces unit 32, entry of an appropriate authorization code would allow the portable electronic device to simply transmit the codes to the receiver 20 or decoder 24 as they would have been received by an existing keyless remote entry device such as item 12. In the event that the portable electronic device replaces unit 40, signal 36 would not be necessary, but signal 38 would preferably be used to transmit an authorization to a separate transmitter 32, with or without buttons, which would in turn broadcast signals 18 or 46, again, as they would have been received in conjunction with the use of an existing remote keyless entry unit.

In a situation where the unit 32 is used both to receive an authorization code and transmit wireless signals, the same pushbuttons 34 may be used to enter actual commands, or additional pushbuttons may be added exclusively for use in the entry of the authorization code. For example, with a controller having buttons for LOCK and UNLOCK, entry of two LOCK commands followed by an UNLOCK command, or some other sequence, perhaps within a certain period of time, would result in an authorization allowing commands such as UNLOCK to be recognized by the receiver 20. Utilizing the amount of time that a button must be depressed, or the number of times that a button must be depressed in a given period of time allows controls having only a single pushbutton to recognize authorization prior to activation.

Continuing the reference to FIG. 1, the remote controller 30 with authorization according to the invention may be supplied in portable form, and, indeed, given the added security afforded by functional block 40 and attendant electrical components, users may prefer to employ only units 30 as opposed to both units 12 and 30. In addition, given the fact that the inventive transmitter cannot be used without prior authorization, the unit 30 may be attached to a vehicle, structure or other facility with less concern that tampering will lead to unauthorized use of the device.

In a vehicular application, for example, it may be advantageous to mount the controller 30 on a vehicle in a stationary, if not semi-permanent or permanent manner. In such a case, at least the keypad of the device 30 may be mounted on an outside surface of the vehicle or, alternatively, the keypad may be supported behind a glass panel to utilize one of the through-glass activation techniques described herein. In terms of internal mounting, it may be advantageous to mount one of the units 32 within the trunk of the vehicle, such that if a child were to become trapped therein, the buttons may be used to unlock the trunk. In such a configuration, at least the trunk unlock key would become illuminated, preferably through the use of a wake-up signal, and the need for authorization codes may be defeated, since it would be unlikely that an unauthorized person would have access to such a transmitter, and it might be more difficult for a child to operate the unit if authorization codes are required.

Figure 2:
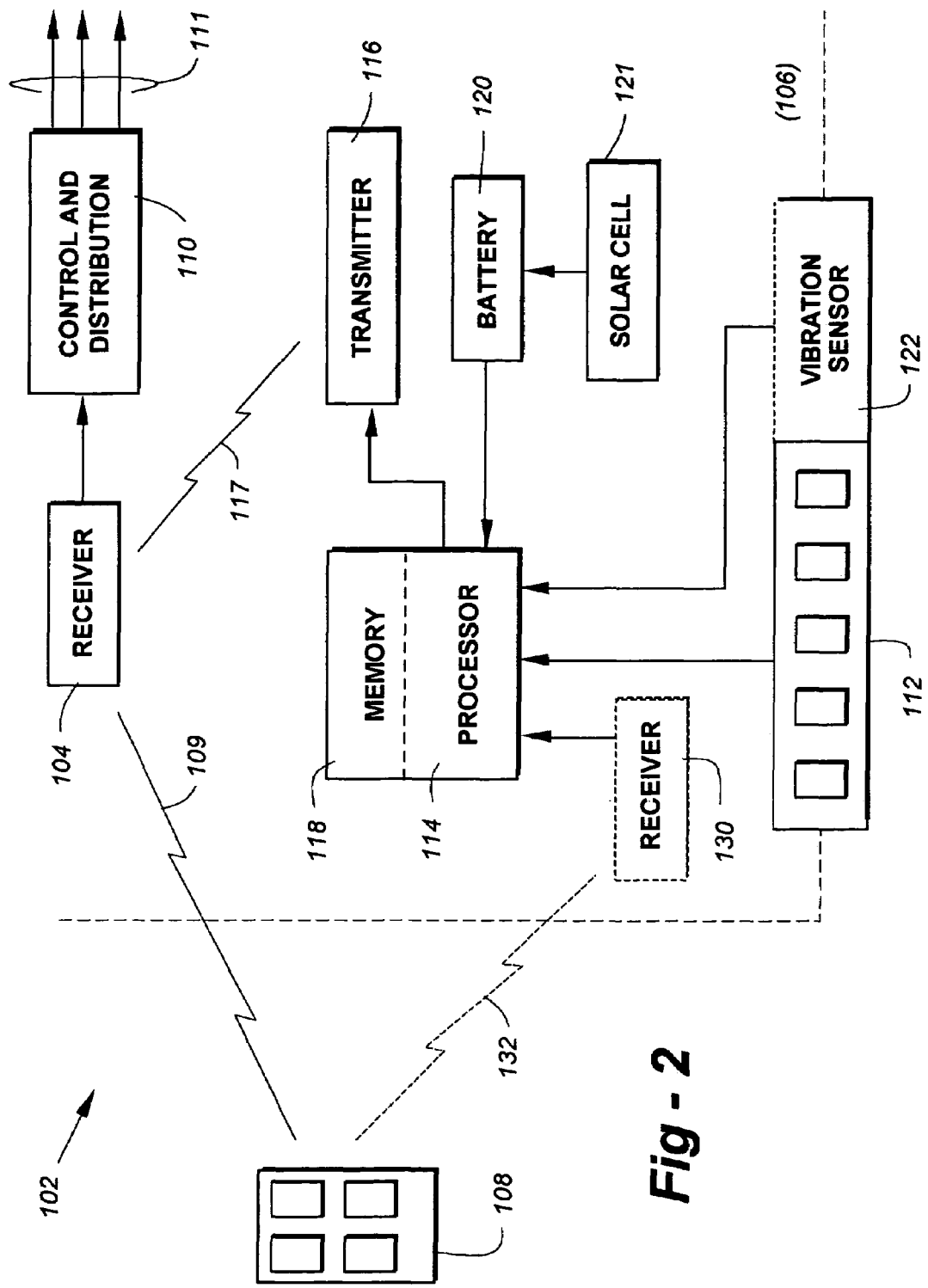
FIG. 2 is a block diagram depicting major electrical functional units provided in conjunction with a vehicular keyless entry embodiment of the invention.

FIG. 2 illustrates generally at 102 major electrical subsystems associated with a vehicular application of the invention, with the area 106 designating the vehicle interior. Item 108 refers to an existing remote transmitter or fob which, if present, may be used to initiate the transmission of an encoded signal 109, typically in RF form, to a vehicle-installed receiver 104. The receiver 104 decodes the commands transmitted by the fob 108, and delivers signals to a control and distribution block 110, which provides outputs along lines 111 to unlock doors, control lights, activate security functions, and so forth.

In this configuration, the invention provides an additional transmitter that preferably duplicates some or all of the codes recognizable by the receiver 104, thereby causing the control/distribution block 110 to perform some or all of the sane functions initiated through the remote 108. The invention is not limited in the number of functions accommodated by the existing remote transmitter/receiver combination, and may be used to perform simple door unlocking or more sophisticated functions such lighting control, alarm arm/disarming, configuring memorized seating or mirror adjustments, starting the heater or engine, and so forth.

As part of the inventive transmitter, a keypad 112 is provided in conjunction with a processor block 114 having a memory 118. The processor and memory may be of conventional, semi-custom or custom design, depending upon functional and economic considerations, with the required technology being well within existing microprocessor capabilities, for example. The processor and memory interface to a transmitter unit 116 which radiates a signal 117 to the receiver 104.

The inventive circuitry, including the processor, memory and transmitter 116, are preferably battery-operated, enabling the invention to be provided as a self-contained unit without the need for extraneous wiring. Accordingly, it may be advantageous to add a solar cell 121 feeding the battery 120 for recharging purposes so that battery replacement may be infrequently, if ever, required. Although battery back-up of the memory 118 is a possibility, at least a portion of the memory 118 is preferably non-volatile in nature, enabling control-codes information to be retained without battery drain.

The electronics preferably includes a shut-down mode which is automatically entered after a preset number of false triggers to save on battery power. The invention may also be made compatible with existing rolling-code type synchronization schemes, though this is not mandatory. More specifically, advanced fob-actuated remote-entry schemes now utilize a relatively complex synchronization scheme whereby the transmission of an initial broadcast by the fob initiates a timing sequence within the receiver so that subsequent communications may be conducted in a synchronous manner. Such a scheme, though complex, helps to guard against theft by keeping track of synchronization timing in addition to the actual codes transmitted, such that if a fob is used repeatedly outside of the range of the appropriate receiver, synchronization will be lost, thereby disabling the ability of that fob to interact with the vehicle.

Although the sophistication of the present invention may easily accommodate such synchronization schemes, more simplified versions of the invention may be implemented, thereby saving on electronic and operational complexity. For example, since the stationary transmitter of the invention is known to be at a particular distance and/or angle of transmission with respect to the receiver, range and/or directionality may be taken into account in addition, or in place of, synchronization. In particular, if an infrared transmitter is used internal to the vehicle, being largely a line-of-sight device, the mere placement and alignment of the stationary transmitter with respect to the receiver may be used to ensure that unauthorized outside transmitters largely will not work unless this correct placement is known and used.

Thus, although the invention is capable of being self-actuated to unlock and immediately auto-relock on an occasional basis to keep linked to the receiver's rolling code and maintain synchronization, the invention may also be adapted to send and/or receive a simpler, more generic signal (i.e., non-encrypted, non-synchronized or rolling), similar to the baseband or decrypted signal used after extraction of synchronization signals, thereby reducing overall system complexity.

As a further energy-saving feature, a vibration sensor 122 may be optionally provided for placement against the glass or other portion of the vehicle, such that voice actuation or a tapping by the user will cause the processor 114 and other main electrical components to power up and begin recognizing numerical codes or direct pushbutton entries through keypad 112. The sensor 122 is preferably of the piezoelectric type, which causes an electrical signal to be delivered along line 123 for reception by processor 114 through the introduction of vibrational energy. Suitable piezo-electric sensors are available from companies such as Amp, Inc. of Valley Forge, Pa., in the form of thin-film "Piezo-Film Sensors" or conventional PZT material may be used for such purpose.

In the event that the electrical signal from the sensor 122 is low power, the electronics may draw a trickle current from the battery 120 sufficient only to detect the signal received along line 123, receipt of which will function to "wake up" the other circuitry. In the event that the electrical signal from the sensor 122 is sufficiently substantial, however, all of the electronics may be entirely powered down, with the current received along line 123 being used itself as the power-up signal, thereby further minimizing quiescent battery drain.

As a further security option, the processor 114 may be programmed to anticipate an encoded series of vibrations from the sensor 122 before waking up, thereby guarding against tampering. As one example of many, the user may program the unit so that three taps on the window in rapid succession (and only such a sequence) will result in the powering up of the transmitter 116 or other circuitry.

The switches are preferably provided in the form of a thin package that can be glued or fastened with an adhesive to an isolated area of the glass of the vehicle. The electronics used to generate the codes may be implemented in a manner similar to that used in the remote keyless entry system itself; that is, board-mounted and covered with a protective overcoating as part of a chip-on-board electronics packaging technique. Although there will remain a small amount of the glass surface area which will be opaque due to the circuit board and the electronics, this area will be small, for example, on the order of 1–2 sq. in. of surface area.

The switches on switch panel 112 may be implemented in a number of different technologies, depending upon the desired physical implementation of the invention. For daylight operation, the switch panel can be viewed directly, but the invention accounts for night operation as well. In this regard the switch panel itself may be substantially transparent, enabling a user to identify individual keys through the panel with the interior dome lights illuminated. Suitable transparent conductive materials are available from by the Boyd Corporation. Or switches may be implemented with fine wire which is essentially hidden but which surrounds a stylized switch outline, such that only a small portion of the electric conductor needs to be transparent.

As a further alternative, a low-power lighting technology such as electroluminescence may be used to illuminate the switch panel following an initial activation sequence, such as tapping on the glass of the vehicle, as discussed elsewhere herein. Although overall switch size is variable as a function of the chosen switch technology, the switch lettering is preferably large enough to be seen in poor lighting conditions by people with or without glasses.

As shown in FIG. 3, the switches 304 may be situated on a thin, flexible circuit board 306 which overhangs the top edge 302 of a window, such as a powered side window. This enables the transmitter and other electronics 308 to remain internal to the vehicle, with the transmission of RF signal 310 to take place within the interior of the vehicle, for example. With the switches accessible from outside of the vehicle, they may be implemented with any known pressure-responsive switch technology such as membrane switches, touch pads, and so forth.

Although the switch panel may be affixed to an external surface of the vehicle, in an alternative embodiment the panel may be mounted within the interior of the vehicle and operated directly through the window glass. With such a configuration the assembly is not subjected to the environmental effects of external mounting. Nor are the switches subjected to wear due to frequent operator manipulation. This embodiment is depicted in FIG. 4, wherein the switches 206 are contained on a panel inside of the glass 204 of a windshield.

In conjunction with the all-internal embodiment of the invention, a switch technology is required that facilitates the detection of a user's finger through the glass. One option is the electrical field sensors offered by Touch Sensor Technologies of Wheaton, Ill. With these switches, an electro-dynamic field is generated between outer electrodes that emanate above, below and through a dielectric substrate, which may be in the form of an automotive window, enabling placement of a user's fingers on the outside of the window to be sensed by the electronics internal to the vehicle.

As an alternative to an electrical sensor, the control panel may employ reed switches, enabling a magnet to be used for activation through the glass. A small magnet may be carried by a user on his or her keychain, for example, and moved proximate to various switches to enter a command sequence. Indeed, with respect to the power-conservation features discussed elsewhere in this disclosure, the use of a small magnet and reed switches presents perhaps the most power conscious embodiment of the invention, in that all circuits could remain entirely off until the sensing of an external magnet takes place. Although the use of an operator-carried item is subject to loss or misplacement, the system would preferably be designed such that any type of small magnet could be used to gain entry, and since it is the sequence responsible for effectuating the various control functions, loss of the user's magnet would not present a risk of tampering of theft.

Other options include the use of optical switches wherein a light beam, preferably in the form of a pulsed beam emitted by an infrared LED, laser diode, or the like, is sent outwardly through the glass and placement of a finger at the correct location causes substantially more reflection of the optical signal back to a receiver located in close proximity to the transmitter associated with that button. By having sets of optical transmitters and receivers, a number of adjacent buttons may be implemented in accordance with the invention. Other alternatives include the use of capacitive technologies used sense a user's finger through the glass, taking the thickness of the panel into account.

In order for the transmitter 116 to send the correct codes along RF path 117 to receiver 104, the processor 114 must store in memory 118 the codes associated with the remote 108 which are otherwise transmitted along RF path 109. In the event that the inventive system is provided as a factory- or dealer-installed option, the memory may come pre-programmed with the codes used by the remote 108. As an alternative, particularly for use in conjunction with a user or vehicle-owner installed version of the invention, a receiver 130 may be provided to "learn" the codes transmitted by the remote 108 along a temporary RF path 132.

During this learning mode of operation, the user depresses the appropriate button on keypad 112 to initiate an unlock sequence, for example, while simultaneously depressing the key associated with the same function on remote 108. This causes temporary transmission of an RF signal along path 132 to receiver 130, enabling the processor 114 to learn the appropriate code and store the same in the memory 118 for subsequent use by transmitter 116.

As shown in FIG. 5, a keypad according to the invention preferably includes individual keys with both numerical and functional designations. Although the drawing shows square keys, they may be round of any other appropriate geometrical shape. In operation, the user preferably performs some function such as tapping on the glass of the vehicle, which at least powers up the electronics associated with further keypad inputs, perhaps even lighting up the keypad if that option is implemented. Assuming the user's personal ID is "724" and the user simply wishes to open the trunk, the user would press keys 408, 402 and 404, in that order, followed by the 406 key (to open the trunk).

The transmitter itself preferably remains unpowered until the correct entry of the "724" to save on battery power, and if the wrong numerical code is entered, after one or a few attempts, the keypad and any auxiliary lighting will turn off and remain inaccessible for a preset period of time to prevent the expeditious, unauthorized random activation of the correct code(s) by a would-be thief and thwart battery-draining tampering. Assuming the correct personal ID, depression of the 406 key causes the transmitter to generate an RF encoded "open trunk" command, and that function is performed. Depending upon the desired operational configuration, the keypad (and transmitter) will preferably remain active for a short period of time (i.e., a few seconds) to accept additional commands, as appropriate.

It is expected that keyless entry systems according to the invention will come from the factory with the same initial primary programming sequence, and that circuitry will be provided enabling the user to personalize the sequence. For example, in one configuration the primary programming sequence can be used to set and/or change the secondary programming sequence. As a further option, the secondary sequence may also be used to set a third code which serves as a temporary access. Such details may be modified as desired by the manufacturer or distributor.

One advantage of the instant invention is that the additional transmitter(s) may be carried or mounted anywhere on the vehicle, inside or out. The recent occurrences of children inadvertently being locked into the trunk along with the deliberate placing of hostages in robberies or kidnappings have encouraged the implementation of a means of opening the trunk from within. As such, the use of a wireless transmitter according to the invention mounted in the trunk can provide an emergency opening of the trunk from within. In this embodiment there is no requirement of an entry code to enable the transmitter. However, it is designed so that it is not likely to be accidently triggered by being struck with an object loaded in the trunk. It is also preferably lighted so as to be easily found in a dark trunk, and battery-operated so as to be easily installed in all vehicles using an RKE system.

Figure 6:
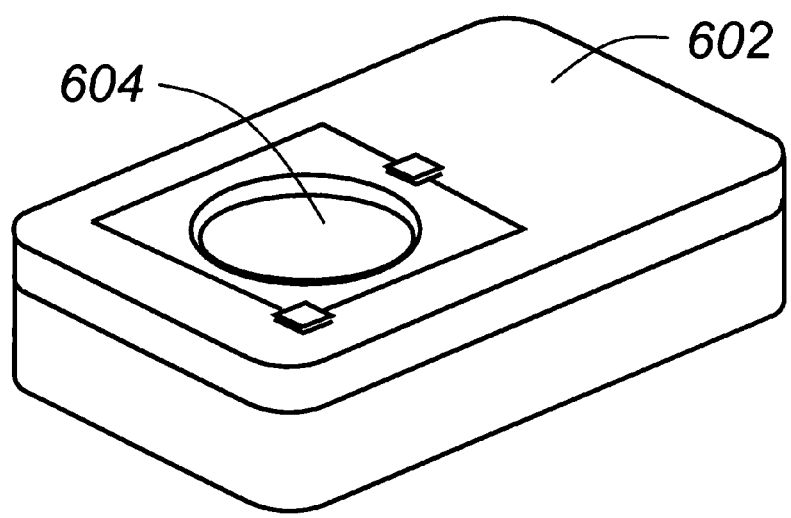
FIG. 6 is a perspective view of an inside-trunk mounted embodiment of the invention.

A preferred configuration of an inside-trunk mounted embodiment of the invention is depicted in FIG. 6. The unit features a housing 602 having a recessed pushbutton 604 so that it is not inadvertently struck by an item in the trunk while traveling. The unit further preferably features a blinking LED located proximate the button 604, so that a child may be naturally led to press the button or, at least, easily instructed to do so. The frequency of the blinking may be very low, on the order of once every several seconds or longer, to conserve on battery power. Once depressed, a transmitter within the housing puts out the same trunk-unlock command as that issued by the fob to which the existing receiver is responsive. Recently, there has been a recognition that hand-held transmitters or fobs have the potential of providing an unauthorized user with a key to the vehicle. Given a few minutes, or even seconds, of access to a user's remote key, a vehicle's interior-mounted security receiver may be reprogrammed to recognize an illegitimate, replacement fob. The unauthorized user may then steal the vehicle or its contents, at that time or at some point in the future.

Due to this potential, systems have been created which attempt to notify an operator of a vehicle that the internal receiver may have been reprogrammed. One such system, called the ATV® or automatic transmitter verification system from Omega of Douglasville, Ga., provides an indicator mounted in the window of the vehicle which is visible from the outside, and which informs the operator as to the number of remotes that have been programmed.

Among the other advantages, it will be appreciated that systems according to the invention provide an inherent tamper indication mechanism, in contrast to add-on devices intended for this purpose. Since transmitters according to the invention preferably use the same digital code combination as that used in the manufacturer-supplied remote transmitter, if the transmitter keypad is not actuated during the reprogramming of the new transmitter, then it will not perform requisite functions such as door-unlock. This alone may function as an alert to the operator that an unauthorized use has take place.

In addition, in an alternative configuration, the RKE keypad mounted on the exterior of the vehicle may be programmed to periodically send out an unlock RF transmission signal to the vehicle, quickly followed by a locking signal. As such, regardless of the condition of the doors, that is, whether locked or unlocked, the RF signal will cause the doors to be locked upon activation of the lock command. The vehicle is therefore always left in a locked or a safe condition after the cycle is completed.

In this embodiment, a sensor is preferably built into the keypad which is tuned to recognize the mechanical "thump" of the doors locking and unlocking. If the sensor does not detect the accompanying locking thump within a very short time of the lock signal (typically on the order of less than 1 second), it means that the receiver on the vehicle is not responding to the transmitted signal, and one conclusion is that the receiver has been reprogrammed since its last activation. A light such as an LED, or an audio signal may further be provided on the keypad, which is readily visible to the operator when they enter the vehicle, so that the operator is alerted to the need to have that vehicle's system updated.

I claim:

1. A command-entry system including a wireless, remote-control device adapted for use with an existing receiver programmed to recognize encoded command signals from an existing portable transmitter, the device comprising:
   a keypad for entering a command;
   a transmitter for transmitting one of the same encoded command signals recognizable by the existing receiver in response to the command entered through the keypad; and
   user authorization means operative to cause the transmitter to output the encoded command signal in response to a keypad entry only in conjunction with the receipt of an identification code.

2. The system of claim 1, wherein the keypad is used to enter the identification code.

3. The system of claim 1, further including a user-carried transponder operative to output an identification code to the device.

4. The system of claim 3, wherein the transponder outputs the identification code is response to a prompt from the device.

5. The system of claim 1, wherein the device is mounted on a vehicle.

6. The system of claim 1, wherein the device is operable to perform one or more of the following functions related to the operation of a motor vehicle:
   unlocking of passenger doors, trunk or fuel door,
   turning lights ON/OFF,
   security system arming/disarming,
   starting engine or heater, or
   adjust seats, mirrors, or other occupant convenience feature.

7. The system of claim 1, wherein the device is operable to perform one or more of the following functions:
   locking/unlocking of home or office doors,
   home or office security system arming/disarming, off-road vehicle and boat entry or control, or
garage-door control.

8. The system of claim 1, wherein the device forms part of cellular telephone or personal digital assistant.

9. The system of claim 1, wherein the transmitter is operative to send out a door UNLOCK command followed by a door LOCK command, enabling a user to determine if the existing portable transmitter has been reprogrammed.

10. A keyless command entry system adapted for use with a vehicle having a wireless encoded command signal receiver, the system comprising:
   a transmitter module including a keypad and a wireless signal transmitter operative to transmit a wireless encoded command signal following a keypad input which is identical to the wireless encoded command signal to which the receiver is responsive; and
   an input for receiving a user authorization code prior to the transmission of the wireless encoded command signal.

11. The system of claim 10, the module further including:
   a rechargeable battery; and
   a photovoltaic cell operative to recharge the battery.

12. The system of claim 10, wherein the keypad is used to enter the authorization code.

13. The system of claim 10, further including a user-carried transponder operative to output an authorization code to the device.

14. The system of claim 10, wherein the transponder outputs the authorization code is response to a prompt from the device.

15. The system of claim 10, wherein at least the keypad is mounted on an outer surface of the vehicle.

16. The system of claim 10, wherein the device is operable to perform one or more of the following functions:
   unlocking of passenger doors, trunk or fuel door,
   adjust seats, mirrors, or other occupant convenience feature.

17. The system of claim 10, wherein the device is operable to perform one or more of the following functions:
   locking/unlocking of home or office doors,
   home or office security system arming/disarming,
   off-road vehicle and boat entry or control, or
   garage-door control.

18. The system of claim 10, wherein the module forms part of cellular telephone or personal digital assistant.

\* \* \* \* \*

UNITED STATES PATENT AND TRADEMARK OFFICE
CERTIFICATE OF CORRECTION

PATENT NO.        : 7,106,171 B1
APPLICATION NO.   : 09/567582
DATED             : September 12, 2006
INVENTOR(S)       : James Burgess It is certified that error appears in the above-identified patent and that said Letters Patent is hereby corrected as shown below:

Column 12, Claim 16, line 11, after "fuel door", insert -- turning lights ON/OFF, security system arming/disarming, starting engine or heater, or --.

Signed and Sealed this

Twenty-seventh Day of March, 2007

JON W. DUDAS
*Director of the United States Patent and Trademark Office*